Figure 3:
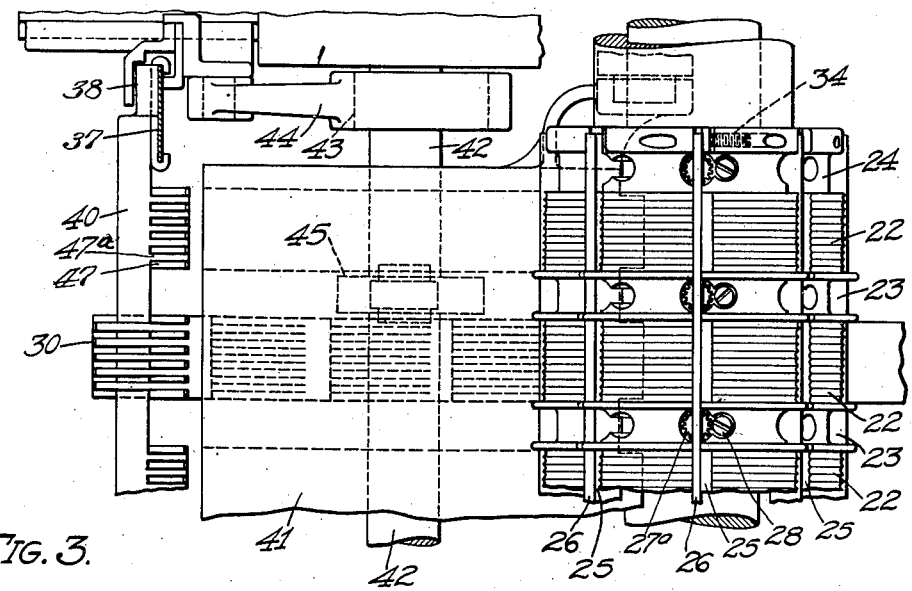

May 16, 1939.  W. W. ALLEN  2,158,350
MATCH BOOK MAKING MACHINE
Original Filed March 5, 1934   10 Sheets-Sheet 1
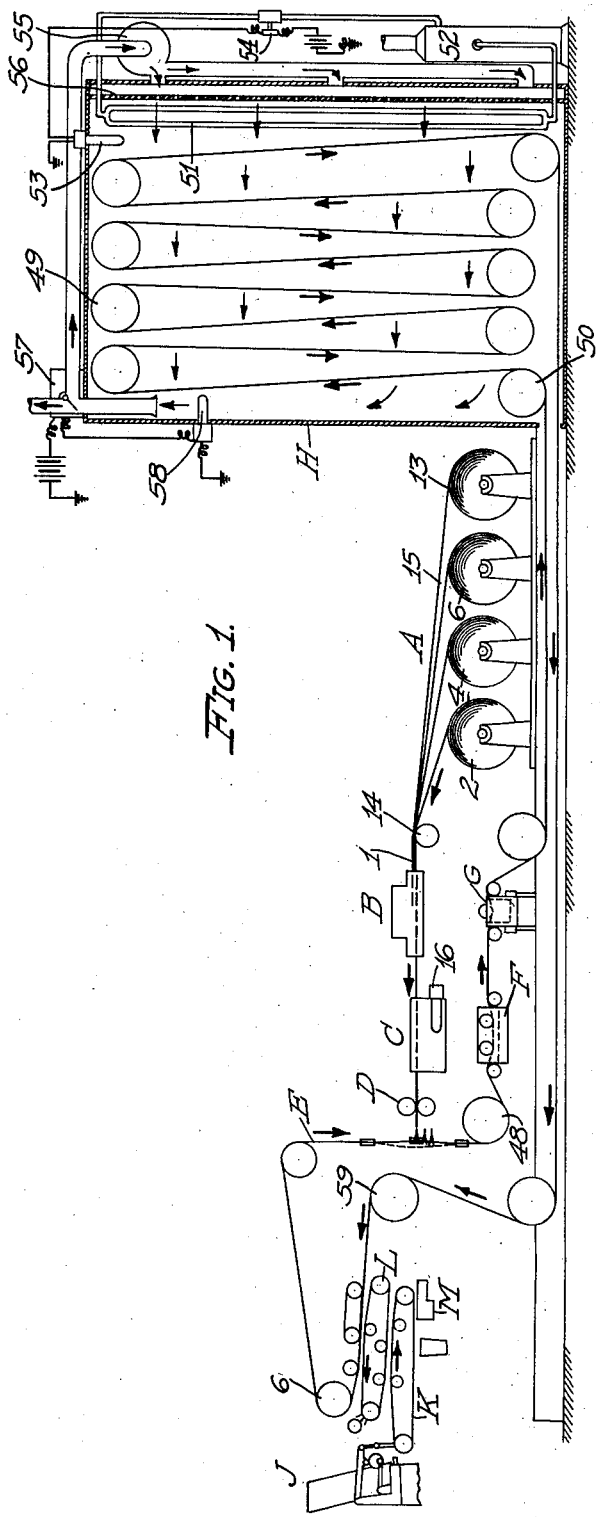
INVENTOR:
W. W. ALLEN,
BY O O Martin,
ATTORNEY.

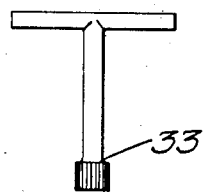
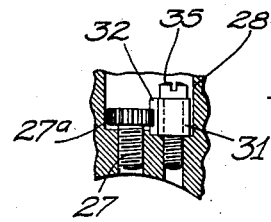
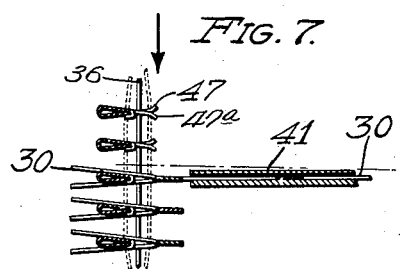
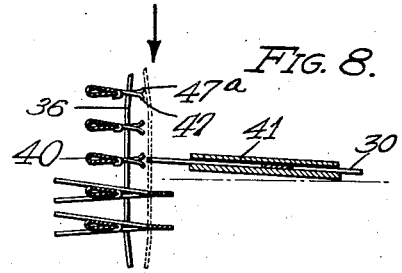
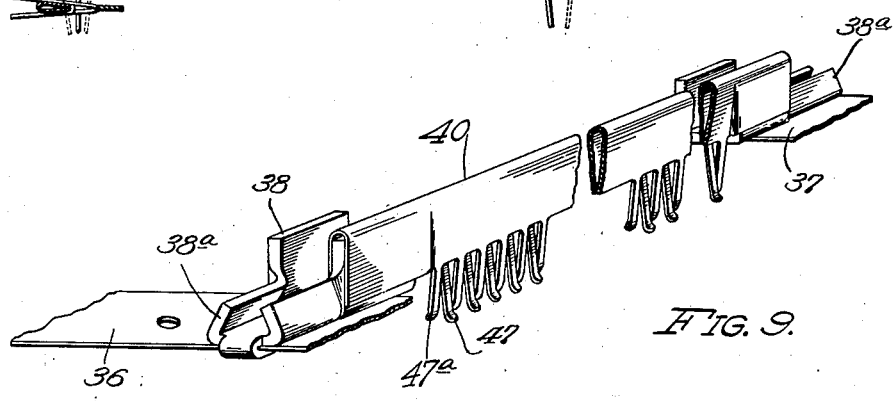
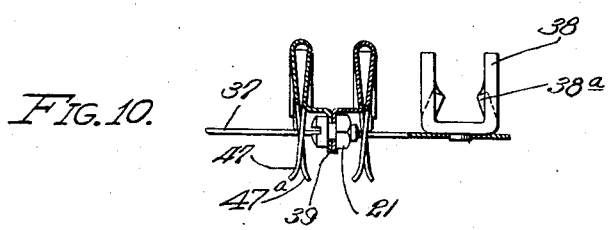

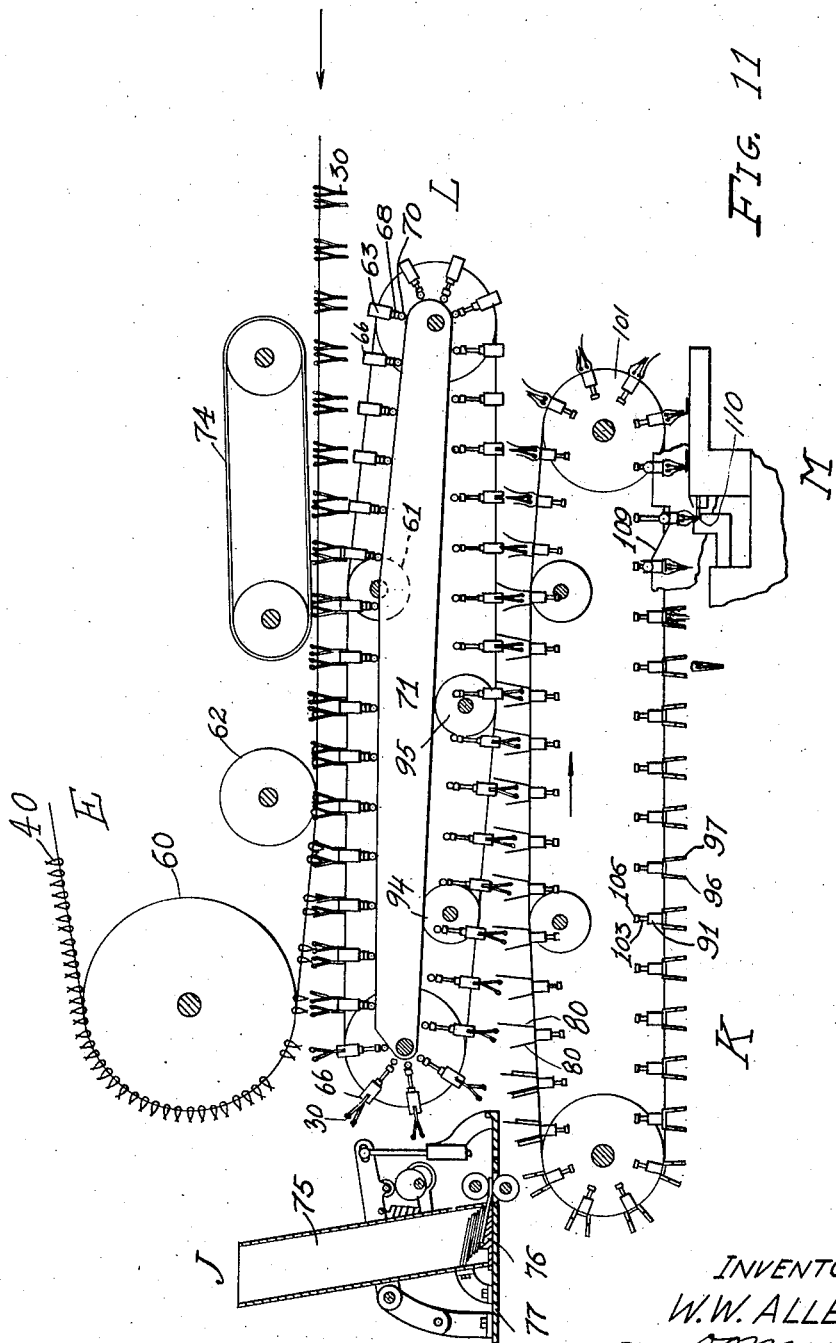

May 16, 1939.　　　W. W. ALLEN　　　2,158,350
MATCH BOOK MAKING MACHINE
Original Filed March 5, 1934　　10 Sheets-Sheet 5
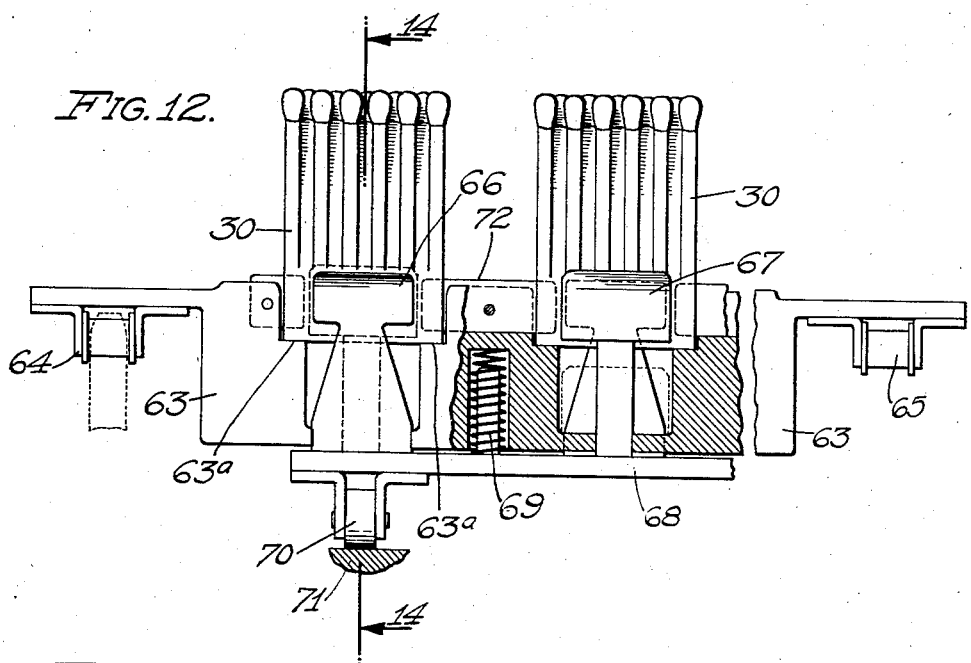
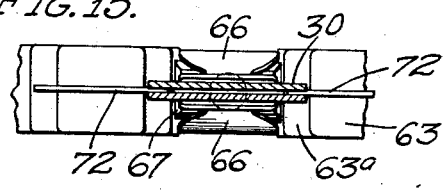
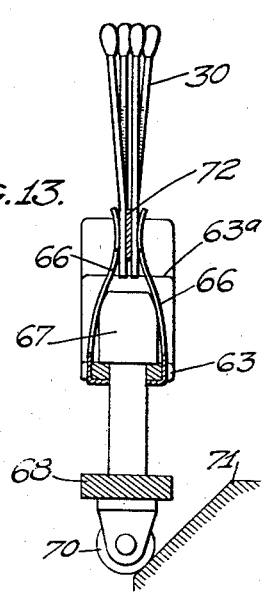
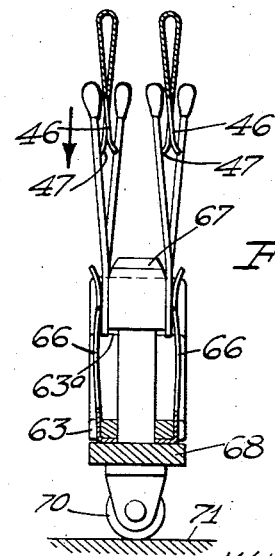
INVENTOR:
W. W. ALLEN.
BY O. O. Martin,
ATTORNEY.

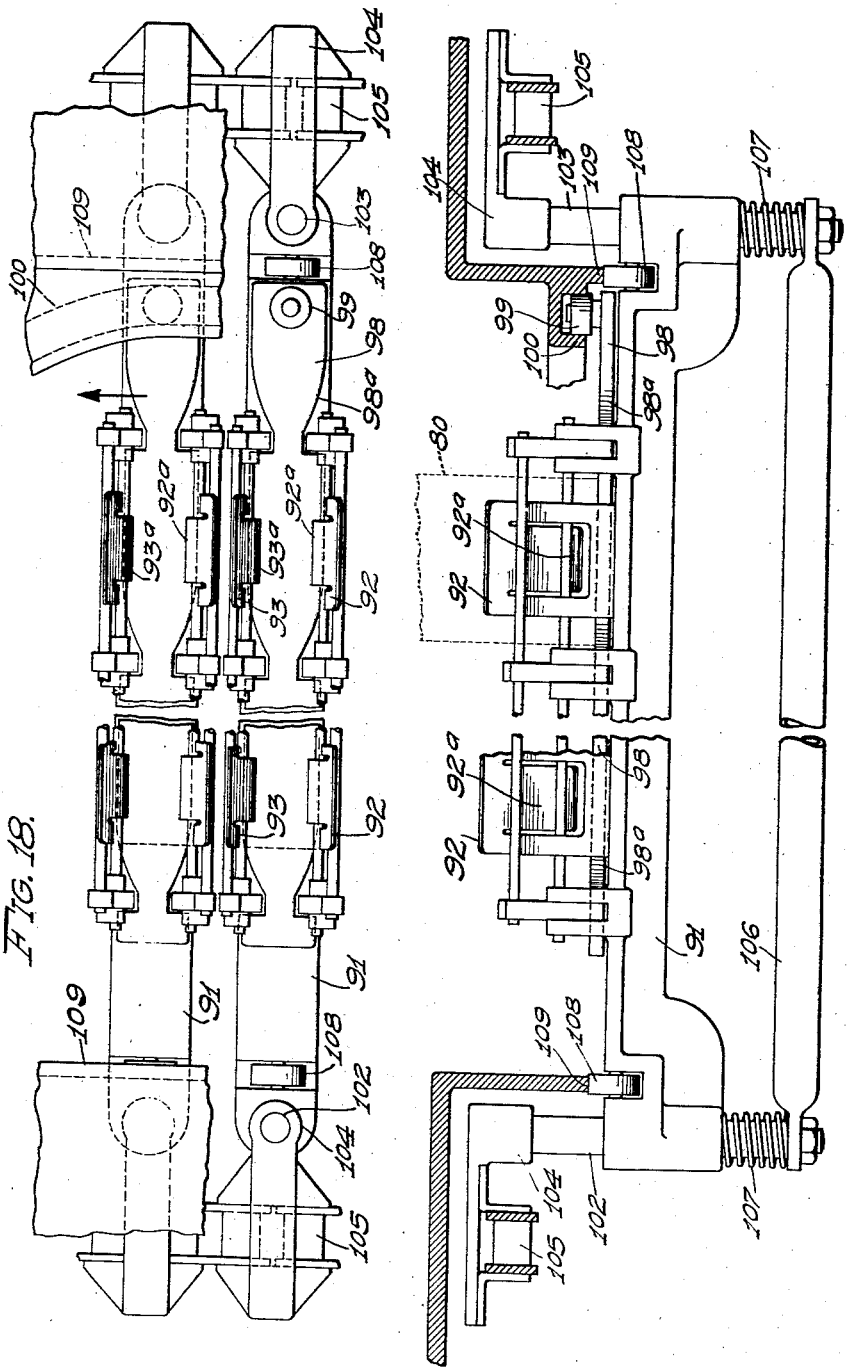

May 16, 1939.  W. W. ALLEN  2,158,350
MATCH BOOK MAKING MACHINE
Original Filed March 5, 1934  10 Sheets-Sheet 8

INVENTOR:
W. W. ALLEN,
BY J. D. Martin,
ATTORNEY.

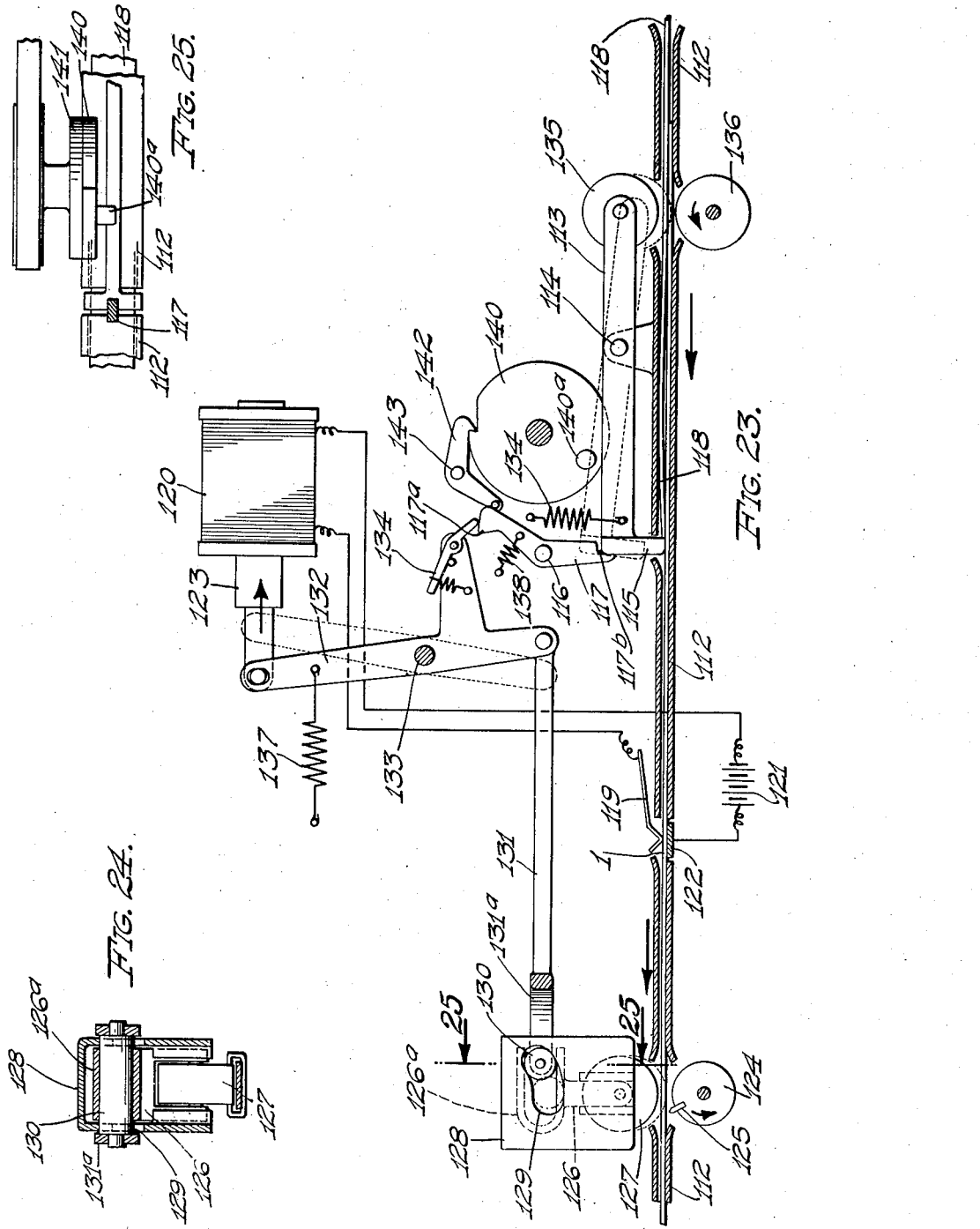

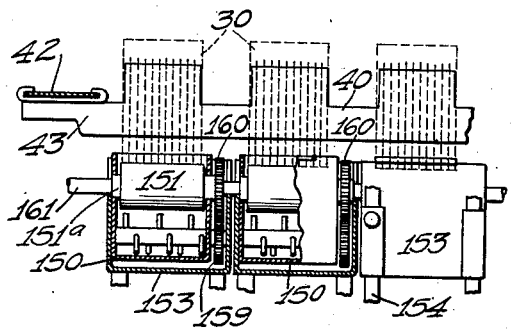
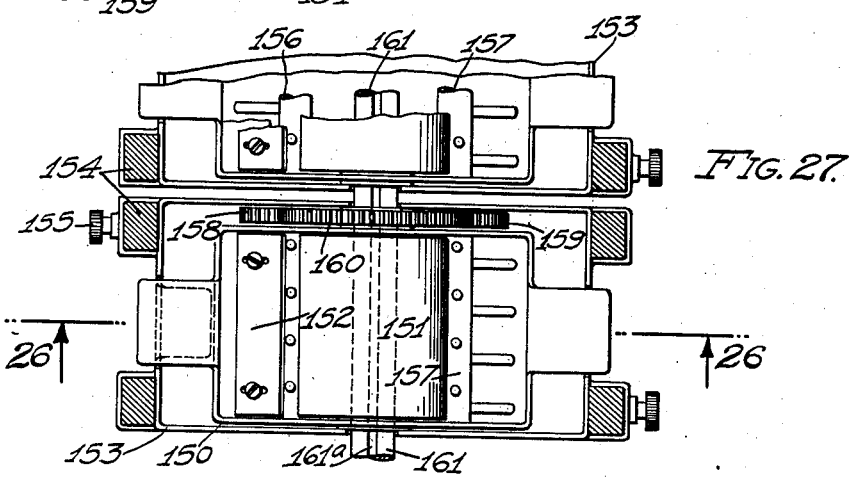
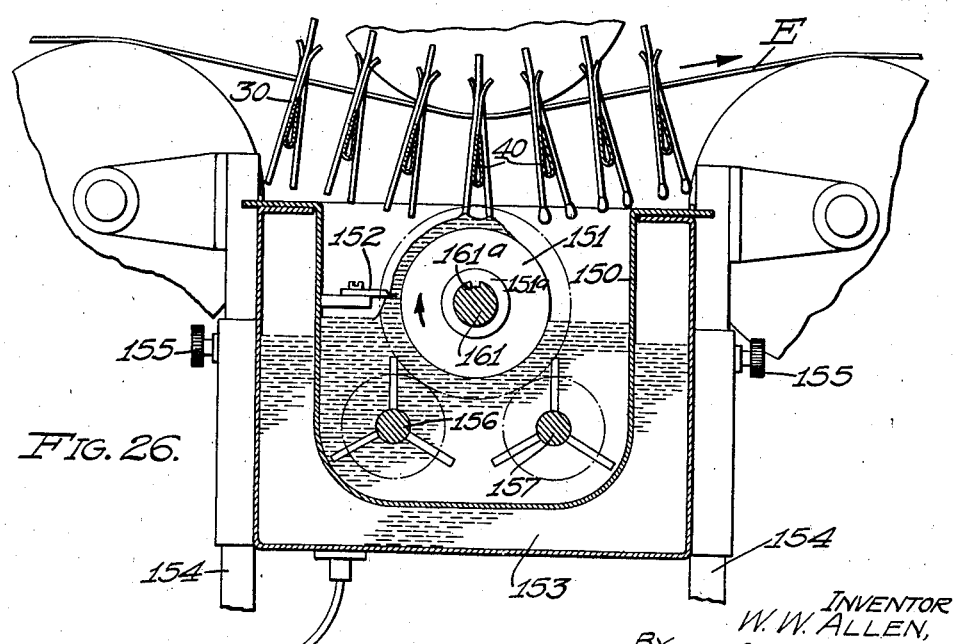

Patented May 16, 1939

2,158,350

UNITED STATES PATENT OFFICE 2,158,350

MATCH BOOK MAKING MACHINE

William W. Allen, Beverly Hills, Calif.

Application March 5, 1934, Serial No. 714,109
Renewed October 21, 1938

26 Claims. (Cl. 93—2)

This invention relates to means for making match books and refers particularly to means for making and heading the splints of match combs and for assembling such match combs in book covers.

The art of match book making is well advanced and standards of size and proportion have been developed and have been generally accepted by the trade. Because of manufacturing conditions, due to the adoption of such standards, and also because of the time required for match heads to dry and harden, most designers of match book machinery have been induced to make the match combs in one machine for delivery to drying racks and subsequent transfer, in magazines, to assembling devices.

A careful study of the problems in connection with match comb making and assembling has convinced me, that the whole series of operations in connection with match book making and assembling can successfully be brought together in one combination of interdependent movements to produce a machine of comparative simplicity, greater and more uniformly perfect output, occupying less space, requiring less power to operate, and less handling of the parts combining to form the finished match books.

The time required for completely and uniformly drying and hardening the match head composition depends upon atmospheric conditions, but is, under favorable conditions, at least several hours. Attempted forcing results in uneven, wrinkled or cracked match heads. The composition will, however, under predetermined, uniform drying conditions, set sufficiently in about one hour to make it safe to assemble the combs in the covers, providing no great pressure is brought to bear against the match heads, and bumps and shocks are avoided.

It is an object of my invention to provide means, including controlled air conditioning, for setting the match head composition sufficiently for safe assembling while the finished match combs pass from the head forming and drying devices to the assembling mechanism. A further object is the provision of means for handling the headed, or tipped match combs in such a manner that contact with the heads is substantially avoided during the assembling operation.

In the type of match book making machines generally in use, a wide web of match comb material is fed into the machine to make match strips wide enough to be separated into several book combs. This web is first intermittently slitted longitudinally to produce the match splints, and is subsequently cut transversely to produce the wide strips. It has been proposed also in such machines, to divide the strips into combs of book width and to carry such divided combs to cover assembling devices, but, because the covers of standard match books are wider than the enclosed combs, it becomes necessary to spread the divided combs for proper registration with the covers into which they are to be assembled, whereupon the machinery for effecting such spreading again must be brought together for registration with the wide strips which have not yet been cut into book widths.

For the purpose of avoiding the use of such expensive, additional mechanism and the difficulty of proper registration, and also in order to obtain ample working space, it is one of the principal objects of my invention to provide a machine into which match comb material, from rolls having the exact width of the finished book combs, is fed in the first instance. It is a further object of the invention, to place a series of such rolls in the machine in proper, spaced relation to bring the finished book combs into perfect alinement with the covers into which they are to be assembled.

The construction of match book machinery depends upon the use to which the machine is put. If the machinery is required merely to produce large runs of identical match books, the problem is comparatively simple. But where, as for example in supplying the advertising business, where match books are very much in demand, short runs of match books in different color and design combinations are ordered, entirely different equipment is required in order to produce match books of high quality and low cost.

It is an important object of my invention to provide, in a single machine, a combination of instrumentalities capable simultaneously, and without much delay for effecting needed changes, of producing great varieties of color and design combinations in match books.

In order successfuly to accomplish this, it is a further object of my invention to provide means for loading the machine with additional rolls of comb material in connection with means for automatically guiding and projecting the web of each new roll into the machine directly behind the end of the web of a used up roll, in order that there may be no break in the continuous, uninterrupted production.

Another object is the provision of improved carriers for the slitted and separated book combs. A further object is to provide improved means for assembling finished book combs in pairs and for depositing the assembled pairs in covers.

Figure 4:
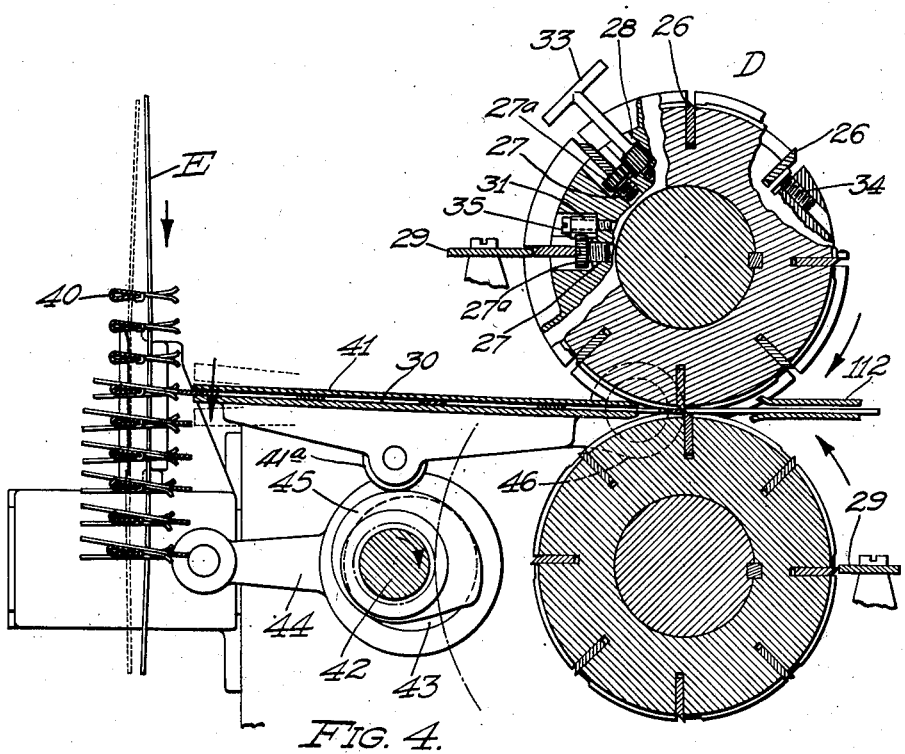
Figure 17:
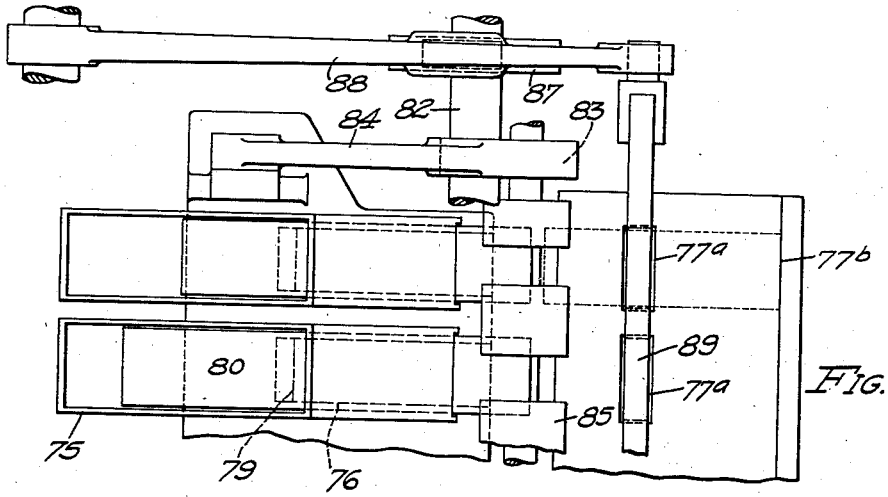
Figure 16:
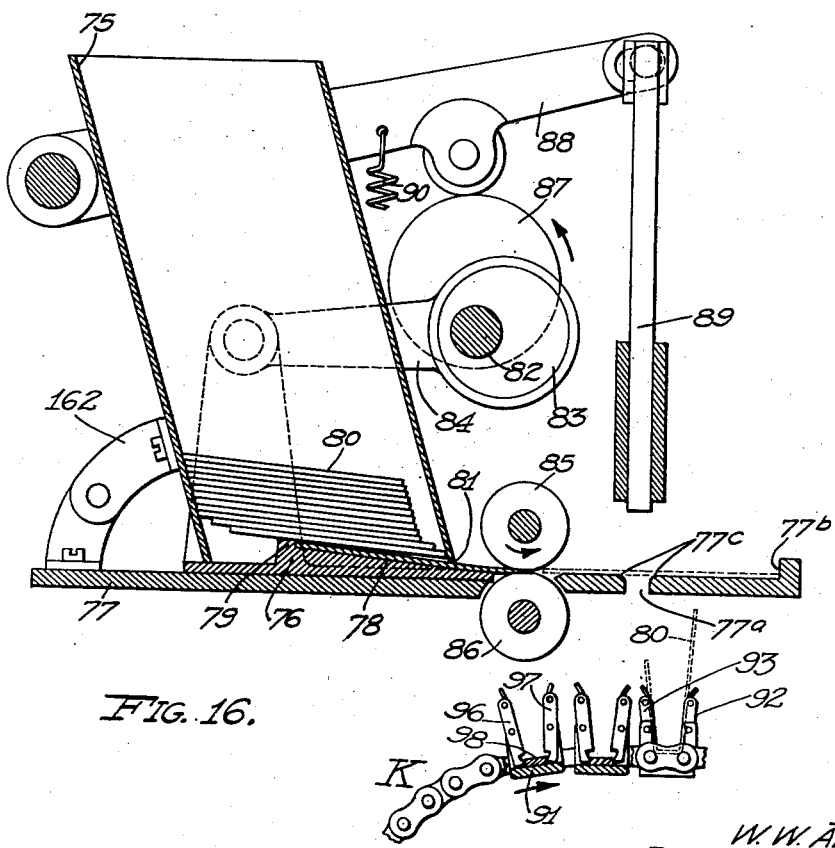
Figure 22:
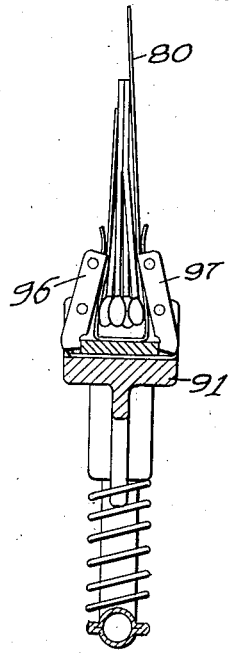
Figure 21:
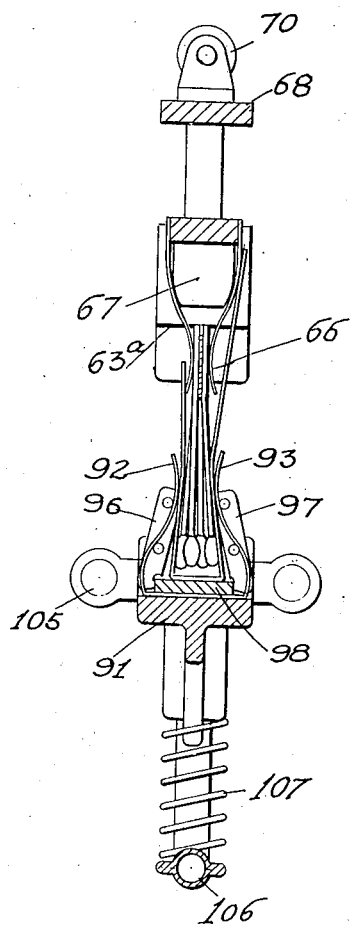
Figure 20:
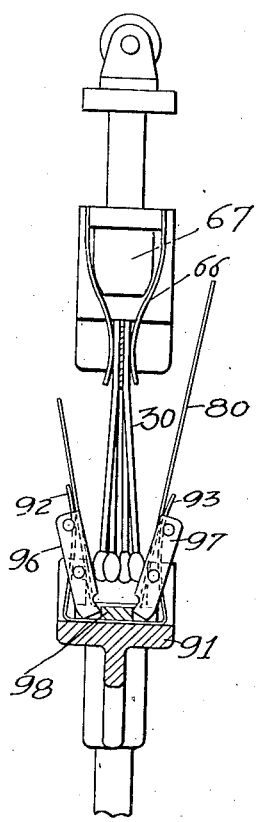
Figure 29:
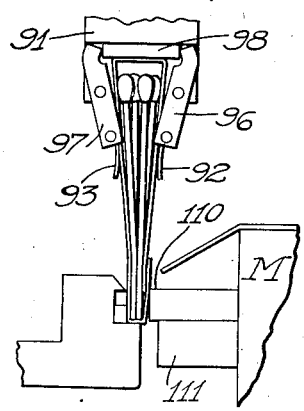

These and the further objects and advantageous features of my invention are fully set forth in the following description and illustrated in the appended drawings, of which:

Fig. 1 illustrates diagrammatically the various interdependent features which combine to form the structure of my invention, Fig. 2 is a sectional, plan view of a part of the devices of Fig. 1, Fig. 3 is a plan view, showing a portion of a mechanism for cutting the match combs and for transferring the combs to comb carriers, Fig. 4 is a sectional, side elevation substantially in agreement with Fig. 3, Figs. 5 and 6 show details of the structure of Figs. 3 and 4, Figs. 7 to 10, inclusive, are sectional views illustrating the construction of the comb carriers, Fig. 11 is a diagrammatic, side elevation, on a larger scale, of the mechanism at the extreme left of Fig. 1, Figs. 12 to 15, inclusive, illustrate means for removing match combs from the comb carriers and for combing pairs of match combs into double combs, Fig. 16 is a sectional, side elevation of the cover magazines of my invention and the means for partly folding and for transferring covers from these magazines to the cover conveyor of my invention, Fig. 17 is a fractional, plan view substantially in agreement with Fig. 16, Figs. 18 and 19 are a plan view and a side elevation, respectively, of the means on the cover conveyor for supporting covers and for closing the sides of said covers on match combs which have previously been positioned within the sides of the covers, Figs. 20 to 22, inclusive, are sectional, side elevations of the supporting and clamping mechanisms of the cover conveyor progressively illustrating the seating of the match combs in the covers on this conveyor, Fig. 23 illustrates means for automatically feeding match comb material from a roll into the machine directly behind the end of the material from an exhaustive roll combined with means for trimming the end of the latter correctly relative to the comb cutting devices in order that the last comb from a roll of comb material may be of exactly match comb length, Figs. 24 and 25 are detailed views of portions of this automatic feeding mechanism, Figs. 26 to 28, inclusive, illustrate means for applying match head composition to the ends of the match splints, the importance of which will be hereinafter fully explained, and Fig. 29 is a fragmentary view showing an assembled match book positioned in proper relation to a stitching mechanism.

Before going into a detailed description of the various mechanisms combining to produce the structure of my invention, in the particular form herein considered, reference is invited to the general arrangement conventionally outlined in Fig. 1, wherein capital letters denote the various interdependent groups of mechanisms of the structure.

The letter A designates a series of rolls of match comb material. B indicates an automatic loading mechanism, in which the front end of each new paper web is held in readiness to follow the rear end of the alined, used up web. A steam chamber, provided for the purpose of taking the curl out of the paper after leaving the rolls, is designated by the letter C. From this chamber, the webs pass through slitting and cutting-off rollers D to a conveyor E, and this conveyor carries the match combs through a paraffin bath F and tipping mechanism G, to a drying chamber H. J is one of a series of magazines for book cover material and a mechanism designed to push each book cover into clips of a conveyor K. The match combs, coming from the drying chamber are picked up by and assembled in pairs, on a conveyor L, from which they are transferred to the covers on the conveyor K, there partly folded, and carried to stitching mechanism M, finally to be expelled for packing.

As above stated, the comb material is delivered in rolls of exactly the width of the finished book combs. A series of such rolls, 2 to 7 inclusive, are shown arranged in pairs in staggered relation in Figs. 1 and 2. Behind the rolls, 2 to 6 inclusive, are shown supports, 8 to 12 inclusive, for a second series of similar rolls and behind the roll 7 is shown one such additional roll 13. The web from the six, first named rolls is shown bent over idlers 14, and extending through the loading device B to the cutting rollers D. The web 15, from the roll 13, is shown carried along the top of the web from the roll 7 and into the loading device B.

For the sake of clearness, the supports, 8 to 12, are shown empty, but I wish it understood that, in practice, these supports are always occupied by additional rolls, the webs of which extend into the loading device B in the same manner that the web 15 is shown extended from the roll 13. From this, it should be clear, that six webs of comb material are fed, through the machine, side by side, and that they are properly spaced transversely for alinement with the book covers in which the combs from these webs subsequently are assembled. As all these webs are alike, and treated in like manner throughout the machine, the following detailed description will be confined to the web, 1, issuing from the roll 2. It is well to state at this time that, while the capacity of the machine is shown to be six books at a time, wider or narrower machines may be provided of greater or lesser capacity without in any way altering the principle of the invention.

The web 1 passes through the loading device B and the steam chamber C to the continuously rotating slitting and cutting rollers D. In the chamber C, steam is held confined under uniform, predetermined temperature conditions by a thermostatic bulb 16, or its equivalent, for the purpose of taking the curl out of the web material before it passes into the cutting rollers D.

These rollers are, in Figs. 3 and 4, shown to comprise annularly grooved sections, 22, held spaced apart by collars, 23 and 24. An equidistant series of axially directed, peripheral depressions 25 divide these annularly grooved portions into lengths corresponding to the length of the match comb splints and, in these depressions, are seated a series of cutting knives 26. As such grooved cutting rollers are well known in the art, no further explanation is thought necessary. I have, however, provided novel means for alining the knives in the rollers as will now be described in detail.

There are provided in the collars, 23 and 24, directly below the knives, pockets in which adjusting screws 27 are seated and the heads of these screws are made with gear teeth 27ᵃ. Adjacent the said pockets, and opening into the pockets, is a second series of pockets, 28, of a size to receive the toothed head of a key 33, by means of which the screws 27 are rotated to aline the knives against a gage bar 29. This bar is mountable on a machine frame for this purpose and should be detached after the knives have been properly alined. The alined knives may then be clamped firmly in position in any suitable manner as by set screws 34. As the two cutting rollers may be substantially alike, this description may pertain to both, the purpose of this description being merely to explain one method of alining the knives and of maintaining them rigidly fixed in alined position. In Fig. 6 is shown a small sleeve 31, for insertion into the pockets 28, and this sleeve is made with a peripheral tooth 32, which is shaped to engage a tooth space of the screw head 27ᵃ, when the sleeve is inserted, whereupon a screw 35 may be employed to lock the sleeve in position. When the sleeve is locked in position, it is no longer possible for the screw 27 to rotate to disturb the alinement of the knives. With the exception of this alining feature, the cutting rollers may be similar to those extensively used in practice. The web 1 is, in passing through these rollers, divided into match combs 30, see Fig. 3.

It is important to note, also, that the knives 26 are arranged to cut the web behind the body portion of each comb and that, as a result, the separated combs are projected from the rollers with the splint end forwardly directed, to the conveyor E.

The conveyor E travels continuously past the continuously rotating cutting rollers, just described, in a vertically downward direction, and it is made with equidistant, transverse series of comb carriers 40. A guide 41 extends horizontally from the rollers to these carriers and this guide is divided into six parallel channels of the proper size to permit the passage of only one comb at a time through each channel.

From this, it is readily seen that the oncoming match combs 30 continuously push each other ahead through this guide, and into the carriers of the conveyor. Below the guide, on a continuously rotating shaft 42, is mounted an eccentric cam 43, supporting an eccentric strap 44, and this strap is in turn connected to vibrate the conveyor transversely, substantially as indicated in dotted outline in Fig. 4. On the shaft 42 is also mounted a second cam 45, which is operatively connected to oscillate the guide vertically, substantially as indicated in dotted outline. For the purpose of such oscillation, the guide is shown pivotally mounted at 46, close to its inner end and provided with a roller 41ᵃ which rides on the cam 45.

The oscillation of the guide and the reciprocation of the conveyor are for the purpose of transferring the match combs from the guide to the carriers of the conveyor. The comb carriers are conveniently spaced about one-half inch apart, and the reciprocation of the conveyor is timed to take place during this one-half inch of travel. A complete oscillation of the guide takes place during the same period, but preferably not uniformly. A better practice is to design the cam 45 to elevate the guide relatively very rapidly and to return it as nearly as possible at the linear speed of the conveyor. The relative position of the two cams should be calculated to bring the conveyor closest to the guide when the latter is approximately at the center of its downstroke, substantially as indicated in Fig. 4. The match comb has, at this point, nearly passed out of the guide. While the two members now continue to move downward, the conveyor commences to draw away and the match comb continues to move forward until, at the end of the downstroke of the guide, the comb has been entirely transferred to the conveyor carrier. This position is indicated in Fig. 7. The guide now quickly rises, while the next following comb commences to project and while the conveyor completes its withdrawal. In Fig. 8, the guide is shown fully elevated and the next following match comb is shown extending far enough out of the guide to reach the next following carrier 40. The guide again commences to move downward, at approximately the linear speed of the conveyor, the conveyor moves toward the guide, and the match comb continues to move forward. The result is, that the comb quickly slides into the conveyor carrier and reaches bottom therein about the time the intermediate position of Fig. 4 is reached.

Attention is now invited to the peculiar construction of the comb carriers 40. As shown in Figs. 9 and 10, each row of carriers is made from a piece of sheet metal formed with groups of prongs, 46, 47 projecting from the sides in opposite directions, whereupon the strip is folded substantially through the center to form a U-shaped bar, the sides of which thereupon are forced inward to cause the prongs to pass each other substantially as shown in the drawings. The conveyor proper is shown made from two continuous belts of metal 36, 37, to which are rigidly secured equidistant brackets 38. Each of these brackets is shaped to receive the ends of a pair of comb carriers and, when these carriers are rigidly secured to the brackets in any suitable manner, as by a welding operation, a complete link of the conveyor E is formed.

The outer ends of the brackets may conveniently be shaped to engage the teeth of a driving sprocket as shown at 38ᵃ in Fig. 9. Intermediate the brackets, the two carriers are shown made with inwardly bent lips 39, and these lips are rigidly combined by means of bolts 21, or their equivalent.

This comb carrier combination is very desirable for the following reasons. For one thing, it is very inexpensive, it is light, strong, and durable, but most important of all, is the shape of the carrier prongs 47, 47ᵃ produced by forming the sheet metal strips as aforesaid. When the match combs, from the cutting roller guide, commence to enter the carrier, it is noticed that the match comb splints commence to travel along the opposite sides of the carrier prongs, and to continue along the body portion of the carrier until they are fully seated in the carrier, whereupon the ends of the splints project some distance beyond the body of the carrier. In this manner, the splints become automatically spread and correctly positioned in properly spaced relation for receiving the ignition composition. In other match comb carriers that have come to my notice, the carrier clips grip the body portion of the combs, leaving the entire length of the splints freely projected, but it is noticed that, in the structure of my invention, the splints are firmly held throughout the greater portion of their length, providing a much more rigid and reliable support.

It is also important to note that the practice has been to effect the spreading of the splints by an independent operation, necessitating additional mechanism, but that, in the device of my invention, not only is such additional mechanism eliminated, but the carrier, in which the spreading is automatically effected, is rigid and holds the comb splints rigidly spread.

The carrier advances downward and bends over guide rollers 48, thereupon to continue horizontally with the splint end of the combs downwardly directed, in position to pass through the paraffin bath F and the tipping mechanism G, to the drying chamber H.

In this chamber are mounted series of guide rollers 49, 50, over all of which the conveyor is bent, finally to pass out of the bottom corner and to return horizontally. In this chamber is mounted a heating coil 51, extending from a suitable water heater or steam boiler 52, and provided to maintain a correct, uniform drying temperature within the chamber, irrespective of atmospheric conditions outside the chamber. At a suitable point, near this heating coil, is placed a sensitive bulb 53 of the type termed a dry bulb, and this bulb is connected to control a valve 54 in any suitable manner well known in the art of heat control.

The air within the chamber is maintained circulating by means of a blower 55, which is shown taking the air from the upper left corner of the chamber and returning it at the right side of the chamber through a suitable distributor 56. A humidity regulation apparatus is conventionally indicated at 57, and this apparatus is controlled by a wet bulb 58 to maintain a predetermined degree of humidity within the chamber at all times. For the sake of simplicity, the connection from the bulb 58 to the apparatus 57 is not shown, but any suitable connection well known in the art of humidity control may be employed.

In this, or in any other suitable manner, the air within the drying chamber is maintained in a continuous state of circulation and at a predetermined degree of temperature and humidity, irrespective of outside, atmospheric conditions. Experience has taught me that, when the air condition within the chamber is properly controlled, the match heads will set and harden sufficiently to permit the match combs to be assembled in the covers while passing through the machine.

After leaving the drying chamber, the conveyor continues to return horizontally underneath the hereinbefore described devices, whereupon it travels upward for some distance and, bending over pulleys 59, it continues horizontally until pulleys or sprockets 60 are reached. It is now noticed that, while in the travel of the comb carriers towards the drying chamber, the combs took a position in the carriers with the splint ends downwardly directed. This position has now been reversed. Combs are carried from the rollers 59 to the rollers 60 with the splint ends upwardly directed.

The short conveyor L, above referred to, is placed below this portion of the match comb conveyor, and it is noticed that the upper reach of this short conveyor gradually rises to, and again drops away from, the match comb conveyor. This relation is best shown in Fig. 11 where the directional movement of the two conveyors just referred to is controlled by rollers 61, positioned to elevate the upper reach of the conveyor L, and rollers 62 which are shown depressing the match comb conveyor.

As above stated, Fig. 11 is a diagrammatic view of the left end of the machine and, although on a larger scale than Fig. 1, the parts are so small that it is not possible to more than merely indicate the parts. The comb carriers 40 are, at the top of the view, shown substantially in proper relation to each other, but, in the balance of this drawing, every other pair of carriers, combs, clips, and covers have been omitted for the sake of clearness. Also such instrumentalities have been more or less completely indicated and reference must be had to the detailed views of the various devices for a complete understanding of their construction.

The construction of the conveyor L is best shown in Figs. 12 to 15, inclusive. This structure which for convenience I term the transfer conveyor, comprises a series of transverse frames or cleats 63, fastened at each end to the conveyor chains 64 and 65. Spring clips 66 are arranged in pairs secured to opposite sides of this cleat and plungers 67 are mounted to slide longitudinally in the cleat intermediate these clips. The inner ends of these plungers are fastened to a bar 68, and this bar is yieldingly held spaced from the cleat by means of suitable springs 69 to maintain the plunger heads 67 retracted, as indicated in Fig. 13. The bar 68 is at each end made with antifriction rollers 70, and these rollers are positioned to ride on fixed cams 71 of the machine frame. One of these cams is shown, in Fig. 11, to extend the entire distance within the transfer conveyor, and it is shaped on the top to hold the plungers 67 advanced within the clips 66, as indicated in Fig. 14. The width of this plunger is substantially the same as the distance between the match comb carriers. As the linear speed of the two conveyors is the same, and when the cleats 63 and the match comb carriers are positioned on the conveyors to travel along in continued alinement, it follows that, as the upper reach of the transfer conveyor approaches the match comb conveyor, the body portions of the match combs 30 are permitted to enter the spaces between the clips 66 and the plunger 67, as best shown in Fig. 14. When the roller 61 is reached, see Fig. 11, the match combs are fully seated in these clips. From this point, until the roller 62 is reached, a gradual and very slow separation begins to take place, which separation, after the roller 62 has been passed, continues very rapidly, causing the match combs to be entirely withdrawn from the comb carriers.

In this connection, attention is called again to the construction and shape of the comb carriers. As above stated, when the match combs are fully seated in these carriers, they are firmly held in correctly spaced position along the greater portion of the match splint, and for this reason will enter the clips of the transfer carrier without any danger of misplacement, but the moment they have become seated in these clips and commence to withdraw from the downwardly tapering comb carriers, it is seen that they instantly become free and separated from the latter, so that there is no danger of possible collision between the carriers and the match splints tending to dislodge the match combs from the transfer conveyor as the angular relation of the two conveyors changes.

The cam 71 drops very suddenly at its left end, permitting the springs 69 to withdraw the plunger 67 from between the clips 66 and in turn permitting the two clips to flex inwardly and to press the two enclosed match combs together. This position is best shown in Fig. 13. Intermediate the two clips and centrally located, is a thin plate 72, see also Figs. 12 and 15, which is provided for the purpose of positioning the two match combs centrally on the cleat, and this is very important in the subsequent operation of assembling the combs in the covers, as will be described presently. Without such central locators, there would be a danger, on account of variations in the spring tension of the clips, of tilting the assembled match combs to one side or the other.

For the purpose of such subsequent assembling, it is also essential that the match combs be seated at a uniform depth on the transfer conveyor. To this end, the cleats 63 are shown made with shoulder portions 63ᵃ on each side of the clips 66 onto which the body portions of the match combs come to rest when the latter are transferred from the comb carriers.

In order further to insure the proper seating of the match combs, it may be found advantageous to place a short fabric belt 74 above the comb carriers, and covering the distance of travel in which the combs are seated in the transfer conveyor. The purpose of this belt is not to depress the match combs, but merely to prevent slight, accidental dislocation of the combs during the transfer.

At this point, it is well again to call attention to the construction of the match combs. It is noticed by reference to Fig. 12, that these combs are shaped to project six match splints to one side, leaving five splints to project in the opposite direction intermediate the former. In this manner, a perfectly balanced comb is provided, and this is very important, both in transferring the combs from the cutting rollers to the comb carriers, and also from the comb carriers to the transfer conveyor. In such other book match making machines as have come to my notice, the combs are made with an even number of splints projecting in both directions, resulting in an unbalanced comb having a tendency to twist while being transferred and, in twisting, to collide with the elements designed to receive it.

Referring now to Fig. 11, it is noticed that the cover conveyor K extends some distance beyond the transfer conveyor and underneath the cover loading mechanism J. This loading mechanism is, in Figs. 16 and 17, shown to comprise a magazine 75, the bottom of which is closed by a slide 76, and this slide is shown mounted to reciprocate on a table 77. The upper surface 78 of this slide is shown slightly forwardly inclined, and the rear end of the slide terminates in a shoe 79, by means of which, match covers 80 are expelled from the magazine through an opening 81 in the lower, front corner of the magazine.

This opening is high enough to permit only one cover to leave the magazine at a time, and the shoe 79 is merely high enough to catch the rear edge of the lowermost cover in the magazine. A continuously rotating shaft 82 is mounted in front of the magazine to support an eccentric cam 83 which, through the medium of a strap 84, is connected to reciprocate the slide 76. Below the shaft 82 is shown mounted a pair of continuously rotating feed rollers 85, 86, and these feed rollers are positioned directly in front of the magazine for the purpose of carrying each cover, which has been projected by the slide, entirely out of the magazine. On the shaft 82 is mounted a second cam 87, and this cam is connected to oscillate a lever 88 thereby vertically to reciprocate a plunger 89 through an aperture 77ᵃ of the table 77.

The cover conveyor K is shown made with equidistant cross bars 91 on a flat top surface of which U-shaped clip members 92, 93 are shown rigidly mounted, see Fig. 16. This conveyor travels clockwise around a sprocket, which is shown positioned directly below the opening 77ᵃ of the magazine table, and it is timed to bring the clip members 92 and 93 in line with this opening when the plunger 89 passes through the opening, thereby to deposit a partly folded cover between these clip members, whereupon the plunger again is retracted through the medium of the eccentric cam 87 against the tension of a spring 90. The covers are in this manner transferred from the magazine to the cover conveyor, one by one, as this conveyor continuously advances.

For the guidance of the engineer or mechanic, it is well at this time to point out the more important features of this cover transfer mechanism. Particular attention should be given to the relation between the speed and timing of the conveyor, the cam shaft 82, and the feed rollers 85 and 86 in order that each cover may be fully projected before the plunger 89 reaches the table 77. The plunger movement should be timed to bring the plunger to the extreme of its downward movement at the time a row of clip members 92, 93 is directly below the plunger. In Fig. 16, the plunger 89 is shown elevated, and a clip 92, 93 has received a cover, and is advancing forward to bring the next following clip in line with the plunger upon its next following downward movement.

Returning now to the magazine construction, it is noticed that the front and rear walls of the magazine are rearwardly inclined, and it has already been stated that the top surface 78 of the magazine slide is slightly, forwardly inclined. The purpose of these relations is to make certain that the covers 80 gradually are forced to advance toward the front, bottom corner of the magazine. The inclination of the magazine walls induces this forward movement as the covers gradually sink to the bottom. The movement of the inclined slide 76 operates to push the stack of covers upward and forward every time the cover is expelled, thereby positively to advance the covers to the lower, front corner. The movement of the slide is comparatively short, and merely sufficient to bring the expelled corner into contact with the feed rollers, which latter are depended upon entirely to expel each cover and to bring it forward to the stop 77ᵇ, which serves properly to locate the cover relative to the plunger 89.

Returning now to Fig. 11, it is noticed that the match combs, within the transfer clips 66, pass around the sprocket at the left end of the transfer conveyor L, to return with this conveyor in the opposite direction above the upper reach of the cover conveyor K. It is also noticed that, during this travel, the match combs gradually enter into the partly folded match covers 80. For the purpose of this gradual insertion, I show two rollers 94 and 95, which are positioned to depress the lower reach of the transfer conveyor, the lowest point of the conveyor being substantially below the roller 95, and this vicinity marks the correct, completely inserted position of the match comb in the cover. From this point, and until the right end of the transfer conveyor is reached, there is again a gradual separation to permit the transfer clips 66 to be withdrawn.

On each cross member 91 of the conveyor K is shown mounted a pair of rock frames 96 and 97, see Figs. 20, 21 and 22, which normally are held in open position by the clip members 92 and 93, as best shown in Fig. 20, with the lower extremities of the rock frames engaging the sides of a cam slide 98, which rests upon the upper surface of the cross bar 91.

A roller 99 of this cam slide is, in Fig. 18, shown riding in a cam groove 100 of the machine frame to move the cam slide along the top surface of the cross bar, and thereby to cause the rock frame members to travel along the cam surface 98ª, to rock these frames into position shown in Fig. 19. The cam 100 is properly positioned on the machine frame to effect this movement of the slide as each cover on the conveyor K approaches the roller 95, and to complete the movement of the rock frames directly below this roller.

When, thereupon, the transfer conveyor gradually draws away from the cover conveyor, it is readily seen that the match comb, being held by the clip members 92, 93, gradually becomes withdrawn from the transfer clip 66. The clips 92, 93 may conveniently be formed with downwardly and inwardly projecting lips 92ª and 93ª, see Figs. 18 and 19, which engage the sides of the enclosed cover to afford additional means for maintaining the covers in position within the clips during the period of withdrawal of the transfer clips 66.

The match combs are now held firmly within the covers to travel with the conveyor around the sprocket 101 and to return in the opposite direction above the folding and stitching mechanism M. When the first folding of the cover was effected by the plunger 89, the bends were made behind the center of the cover, relative to the direction of movement of the cover conveyor, with the result that the forward side of the cover in the conveyor was left considerably longer than the other side. When, now, the covers pass around the sprocket 101, and along the top surface of the mechanism M, it is noticed that the overhanging side of the cover gradually is folded over the body portion of the match comb within the cover, see also Fig. 11.

The ends of the cross members 91 are shown perforated to ride on posts 102, 103, see Fig. 19, and these posts are fastened to special link attachments 104 of the conveyor chains 105. A cross bar 106 is shown interconnecting the ends of these posts for the purchase of rigidity. Suitable springs 107 are shown mounted on the posts intermediate these bars and the cross members for the purpose normally of maintaining the cross members pressed against the chain links 104.

In the cross member is shown seated a pair of rollers 108 positioned to ride on stationary cams 109 of the machine frame. Normally, these cams maintain the cross members retracted against the tension of the springs 107, but, when the covers and enclosed match combs, traveling with the cover conveyor, reach the end of the folding mechanism M, see Fig. 11, there is a sudden drop in the stationary cam 109, which permits the cross members to be suddenly advanced and to push the covers into a groove 110 at the end of the mechanism M, thereby to complete the folding of the cover. This position is best shown in Fig. 29.

The extreme end of the mechanism M, indicated by the numeral 111, is part of a stitching mechanism, which at this point closes on the lower end of the cover and forces a staple through the cover and the body of the match combs, thereby to complete the match book. The cam 109 now again rises to withdraw the slide bar and the match book from the stitching mechanism which, at the same time, opens to permit the free withdrawal of the match book.

As such stitching mechanism is well known in the art, and used in most match book assembling machines, it is not thought necessary further to describe the details of such mechanism.

The cam 100, which controls the movement of the slide bar 98, now gradually returns to its initial, transverse position on the machine frame, thereby to permit the rock frames 96 and 97 to return along the cam surface 98ª to the initial position shown in Fig. 20 and the spring members 92 and 93 again to open to permit the finished match books to drop out. This completes the interdependent series of operations necessary to manufacture complete match books.

It was stated above that the stationary cams 109 normally maintained the cross bar 91 retracted against the tension of the springs 107, and that the springs only are released to project the cross bar at the time the covers are suddenly projected into the stitching mechanism. In actual practice, however, and for the purpose of relieving the tension of these springs, the devices are designed normally to maintain the springs expanded and they are not compressed until the cross bars approach the folding and stitching mechanism. Because the first described method simplifies the drawings, it is preferred for the purpose of this specification, but the second method, while more complicated, is preferable in practice.

The automatic loading device of my invention will now be described, and it is illustrated in Figs. 23 to 25 of the drawings. The web 1 passes through a guide 112, which extends to the cutting rollers D, see also Fig. 4. A lever 113 is shown mounted above this guide to oscillate on a pivot 114, and one end of this lever carries a transverse bar 115, which extends through a window in the upper member of the guide. Above this bar, on a pivot 116, is shown mounted a trigger 117, and this trigger is made with a shoulder portion 117ᵇ, engaging the upper corner of the bar 115, thereby normally to maintain this bar in touch with the web 1. As above stated, a reserve roll of match comb material is always held on the support 8, see Fig. 2, and the web 118, from this roll, is, in Fig. 23, shown entering the guide 112 above the web 1, and to extend forward to the cross bar 115, but unable to pass this bar until the latter is withdrawn. Further along the guide is shown a second window in which a contact finger 119 is shown resting on the top surface of the web 1.

From this finger extends a conductor through a solenoid magnet 120 to a source of electric energy 121, and this conductor terminates in a contact plate 122 rigidly mounted below the contact finger, and spaced therefrom by the web 1. Normally, while the web is passing through the guide, the instrumentalities just named remain dormant, but the moment the end of the web passes the contact finger 19, a contact is made to energize the magnet, and to pull its plunger 123 inward.

Near the forward end of the guide 112 is an opening below which is mounted a continuously rotating roller 124, which carries on its periphery an axially positioned knife 125. A yoke 126 is shown mounted to slide vertically above this window and an idler 127 is mounted to rotate on this yoke. The support 128 in which this yoke is mounted to slide is made at each end with a downwardly and forwardly directed perforation 129 in which a transverse roller 130 is seated.

The yoke 126 is shown provided at the top with a horizontally directed fork 126ª of a width slidably to fit the roller 130. The outer ends of the latter are journaled in the bifurcated end 131ª of a connecting rod 131, the opposite end of which is pivotally mounted on one end of a bell crank 132, and this bell crank is in turn journaled on the end of the plunger 123.

The movement of the plunger, when the circuit is closed, causes the bell crank to rock on its fulcrum 133, and, through the medium of the connecting rod 131, to push the rod 130 downward and forward in the cam openings 129, thereby to depress the idler 127 and the web 1 sufficiently to contact with the periphery of the roller 124. The latter is, by means of gears or sprockets, positively connected to be rotated at a predetermined speed relative to the speed or rotation of the cutting roller and the knife 125, positioned on the periphery of the roller to contact the web each time a match comb is separated from the web by the knives in the cutting rollers.

In view of this, it is seen that, when the idler 127 is forced downward, as aforesaid, and the knife 125 reaches the web, it will cut off whatever remains of the web between the idler and the contact finger 119, and this severed portion of the web is free to drop through an opening in the bottom of the guide in front of the cutting roller 124. If now the distance between the center line of the rollers 124, 127, and the center line of cutting rollers D, equals a multiple of match comb lengths, it is seen that the trimmed end of the web will reach the cutting rollers at the time two of the knives of these rollers come together on the center line, and that for this reason, the last match comb to enter the machine will be of exactly the same length as the preceding combs.

The bell crank 132 is shown carrying a pawl 134 which is positioned to ride over a cam surface 117ª of the trigger, thereby to rock the latter on its pivot to release the lever 113 the moment the contact is made, and to permit a spring 134 to tilt this lever substantially as indicated in dotted outline. Now it is noticed that a roller 135 is mounted to rotate in the opposite end of this lever, and a roller 136 is mounted to rotate continuously below the guide at this point. From this, it will be seen that when the lever 113 is tilted by its spring to depress the upper roller, and with it the web 118 against the continuously rotating roller 136, and when simultaneously the cross bar 115 is elevated clear of the front edge of this web, the latter is free to be advanced through the guide by these rollers. If now the speed of the feed rollers 136 is considerably greater than that of the cutting rollers D, which normally feed the web through the machine, it is seen that the web gradually approaches the rear end of the web 1, and it is to be remembered that the speed of the feed roller 136 must be sufficiently high to make certain that the new web reaches the end of the old web before the end of the latter reaches the center line of the cutting rollers.

There is no harm in this meeting taking place before the cutting rollers are reached as in that case, the feed roller 136 merely will slip on the web. It is at this point important to note that, when the new web 118 reaches the contact finger 119 and elevates the latter from the contact plate 122, the circuit is again broken, permitting a spring 137 to return the bell crank to its initial position and, in doing this, to return the rod in the cam openings 129, thereby again to elevate the idler 127 in order that, when the new web passes between the rollers 124 and 127, the knife 125 may become ineffective.

When the service of the feed roller 136 is no more needed, and before a new reserve web is placed, it becomes necessary to depress the cross bar 115 of the lever 113 to permit a spring 138 to bring the trigger 117 back into contact with the cross bar. This may conveniently be done by hand, but may be done automatically, if desired. For the purpose of such automatic reseating, I have shown a disk 140 to be frictionally driven by a continuously rotating disk 41, and this member 140 is shown made with a peripheral notch engaged by a pawl 142. The latter is shown mounted to turn on a pivot 143 and is, at its opposite end made with a cam substantially coinciding with the cam 117ª of the trigger. When shaped in this manner, it is seen that this pawl is rocked to release the member 140, at the same time the trigger is rocked, permitting the member to be rotated by the disk 141 until a projection 140ª, of the member, reaches and depresses the lever 113 to reseat the mechanism as aforesaid. The speed of rotation of the member 140 must, of course, be very slow in order that the new web may reach the cutting rollers before the reseating takes place, in order not to disturb the service of the feed roller 136.

It was stated hereinbefore that one of the most important objects of my invention is to provide a machine capable of producing, at the same time, match books in different color and design combinations. Of the two main features necessary to obtain this object, the one, namely the method of feeding match comb material in match comb width through the machine, has been fully described; the second essential feature will now be explained.

There is, in the structure of my invention, a separate, independent head composition device for each web of match combs, and such device is illustrated in Figs. 26 to 28. The composition pot proper, 150, is of a width to permit one line of match combs 30, on the carriers 40, of the conveyor E, to dip into the pot and there to touch the periphery of a roller 151, carrying a film of match head composition. An adjustable scraper 152 is provided to regulate the amount of composition needed to provide heads of the proper size on the ends of the match splints. This pot is shown seated within a larger tank 153, in which water is maintained at a temperature high enough to insure the proper consistency of the match head composition, in any suitable manner. The tank 153, carrying the composition pot, is shown vertically slidable on posts 154 of the machine frame and means, such as set screws 155, are provided for clamping the device in fixed position on these posts. The roller 151 is made at each end with a shoulder portion 151ª which is seated to rotate in the walls of the composition pot. Below this roller is shown mounted a pair of agitators 156, 157 which, through the medium of gears 158, 159, are connected to be rotated by a gear 160, and this gear is rigidly secured to one of the hubs 151ª of the composition roller. The latter, together with two agitators, is mounted within the composition pot, and the interconnecting gears are placed on the outer surface of the pot, between the walls of the pot and the wall of the water tank.

Such construction permits the free insertion and removal of the composition pot, with its rollers and gears, from the water tank at any time, and the water tank is vertically movable on the posts 154 to be lowered sufficiently when it is desired to remove the composition pot entirely to clear the match combs, which need not be disturbed in any way by the removal or replacement of the composition pot. The composition rollers are shown centrally perforated to receive a drive shaft 161, which should be long enough to extend through all the composition pots of the machine, and which is shaped to drive the rollers in a suitable manner, as by a spline of the rollers engaging a key-way 161a of the drive shaft.

From this description, it should be clear to those versed in the art, that each composition pot is independently removable for cleaning, and for replacement by a pot containing composition material of a different color, without disturbing any other part of the machine, and that the time required for removing a composition pot and replacing it by another is so short that no appreciable disruption of the continuous operation of the machine is necessary. In actual practice, I provide an independent drive shaft for each composition pot, and means for interengaging the ends of these shafts when the pots are placed in position, but, as such mechanism is more complicated to illustrate than the one above described, it has not been here illustrated.

From the above description, it is seen that I am able to provide any color combination of composition desired for each individual web of match combs; also that I am able to feed match comb material into the machine in webs of different colors.

If, at any time, it is desired to change the color of a comb web, it is only necessary to place a web from a reserve roller of the required color in position within the loading mechanism, and to cut the web of the roll, which is no more desired, as with a pair of shears, and the change will take place automatically. When, then, the new match combs approach the composition pot, the machine is stopped momentarily, the pot removed, another pot inserted and positioned, and the machine again started. Such combination has not been found in any machine that has come to my notice.

The cover magazine should be mounted on the table 77 for quick withdrawal in any suitable manner. This feature is here illustrated by providing a support bracket 162, made in two parts pivotally joined together. When covers of a different color or printing combination are required in any one magazine, the latter may quickly be withdrawn to remove the covers still remaining therein.

The important point I wish to emphasize is that, by feeding comb material of exact width through the machine; by loading the machine with additional comb material for automatic continued feeding; by making the composition pots individually interchangeable; and by quick exchange of cover material in each magazine, a novel combination is obtained ideally suited for the manufacture of match books in job lots of various sizes and combinations. All these operations are necessarily interdependent, and it should be noted that, while the capacity of the machine is great, the speed of the progressive movement of the material is slow, giving ample time for each operation to be completed safely and smoothly, without sudden jarring effect.

I claim:

1. In a match book making machine, means for continuously and uninterruptedly feeding a plurality of webs of individual match comb width into the machine, means for dividing the material of each web into match combs, a comb carrier, comb supports on said carrier, and guiding means for passing the severed combs from each web comb into engagement with the supports on said carrier, said supports being shaped to spread the splints of the combs as they slide onto the supports.

2. In a match book making machine, means for continuously feeding a plurality of webs of match comb material in comb width into the machine in laterally spaced relation, means for dividing the material of each web into match combs, a conveyor made with equidistant tapering carriers, means for simultaneously guiding the divided match combs from each web into engagement with said carriers thereby to spread the splints of the combs while sliding onto the carriers, means for forming match heads on the comb splints on said carriers, means for transferring the match combs from said carriers into book covers, and means for folding and stitching said covers around the said match combs.

3. In a match book making machine, means for continuously feeding a plurality of webs of individual match comb width into the machine in laterally spaced relation, means for cutting and dividing the material from each web into match combs, a match comb carrier made with equidistant perpendicularly directed tapering clips, means for guiding match combs from said dividing means into engagement with said clips thereby to spread the splints of the combs as they pass along the tapering faces of the clips, individual means for the combs of each web for forming match heads on said splints, means for guiding the comb filled carrier through a drying chamber of the machine, means for maintaining predetermined uniform air conditions within said chamber, means for transferring the combs from said carrier into book covers, and means for folding and stitching the covers on the combs.

4. In a match book making machine, a series of spools for supporting match comb material of match comb width, means for continuously feeding the material from said spools into the machine, a second series of material spools, means for automatically and uninterruptedly feeding the material from said second spools into the machine in continuation of the ends of the material from said first named spools, and means for correctly trimming the rear end of the first material as it is approached by the front end of the second material.

5. In a match book making machine, a series of spools supporting rolls of material of match comb width, means for feeding the material from said rolls into the machine, means for cutting said material into match combs, a corresponding series of match head composition applying devices, means for carrying match combs from each of said rolls through each one of the said devices, a corresponding series of book cover magazines, intermediate carrying means, means for transferring headed match combs from said intermediate carrying means to the said covers, and a corresponding series of mechanisms for folding and stitching the covers on the said match combs.

6. In a match book making machine, means for feeding webs of match comb width into the machine in spaced relation, means for cutting the webs into match combs, a corresponding series of interchangeable composition applying devices, means for carrying the combs from each of said webs through its corresponding composition applying device, a series of corresponding cover magazines, means for transferring covers from said magazines onto correspondingly spaced carriers, means for transferring finished match combs to the covers on the said carriers, and means for folding the covers around said combs and for stitching the covers on the said carriers.

7. In a match book making machine, means for carrying a series of material webs of match comb width into the machine in spaced relation, means for continuously cutting material from said web into match combs, means for receiving the combs from said cutting means for automatically spreading the splints of the combs while being received and for carrying the combs through the machine in the same spaced relation, a corresponding series of head composition applying devices in the path of travel of said comb carrying means, air conditioned means for setting the composition on the match comb, a corresponding series of cover magazines, intermediate carrying means, means for transferring match combs from said intermediate carrying means to covers from said magazines, and means for folding said covers around the said combs and for stitching covers.

8. In a match book making machine, means for feeding webs of match comb width into the machine in spaced relation, means for cutting the webs into match combs, head composition applying devices comprising a detachable composition pot for each web, means for carrying the combs from each of said webs in the same spaced relation through each of the said detachable composition pots, and means for drying the heads formed on the match combs in said pots.

9. In a match book making machine, a series of spools for supporting rolls of material of match comb width, means for continuously and individually feeding the material from said roll into the machine and for continuously cutting the material from each spool into match combs, means for taking the curl out of each match comb as it passes to said cutting means, a match comb carrier, tapered clips on said carrier, and means for guiding match combs from said cutting means into engagement with the clips on said carrier thereby simultaneously to spread the splints of the combs.

10. In a match book making machine, a series of spools for supporting rolls of material of match comb width, means for feeding the material from said rolls into the machine and for cutting the material into match combs, means for taking the curl out of the material as it passes to said cutting means, a match comb carrier, tapered supports on said carrier, and means for guiding the match comb into engagement with the supports on said carrier thereby simultaneously to spread the splints of the combs.

11. In a match book making machine, a series of spools supporting rolls of material of match comb widths, means for feeding the material from said rolls into the machine and for cutting the material into match combs, a second series of spools carrying material rolls of match comb width, means for automatically feeding the material from said second rolls into the machine in uninterrupted continuation of the ends of the material from said first named rolls, said means including devices for correctly trimming the ends of the first roll before the beginning of the second roll reaches this end, and means for taking the curl out of the comb material before it reaches the said cutting means.

12. In a match book making machine, spools for supporting a roll of material of match comb width, means for cutting the web from said roll into match combs, a comb carrier, tapered clips on said carrier, means for guiding match combs from said cutting means to the clips on said carrier to spread the splints of the combs as they enter said clips, and interchangeable head composition applying device, means for guiding the comb supporting carrier through said device to form heads on the splints of said combs, and air condition means for setting the composition of said heads.

13. In a match book making machine, means for slitting and cutting material from webs of individual match comb width into match combs, a conveyor, tapering supports on said conveyor, and means for guiding match combs from said cutting means into engagement with the said support thereby to seat the combs on the support and simultaneously to spread the match splints of said combs.

14. In a match book making machine, the combination with means for making match combs, of tapered supports, and means for passing said combs into engagement with the said supports to seat the combs on the supports and simultaneously to spread the match splints of said combs.

15. In a match book making machine, a match comb clip comprising a U-shaped body portion in the sides of which are cut fingers in alternate staggered relation, the sides being inwardly bent to cause the fingers on one side to pass into the spaces of the fingers of the opposite side thereby to produce a rigid inwardly tapering support into engagement with which match combs may be brought by pushing the match splints of the combs along the tapering surfaces of the fingers until fully seated with the match splints firmly held along the fingers and body portion of the supports.

16. In a match book making machine, a conveyor for carrying rows of individual match combs equally spaced longitudinally, a transfer conveyor movable in the same direction as the comb carrying conveyor in close proximity thereto, said transfer coveyor being made with correspondingly spaced double clips, the directional movement of the two conveyors permitting the match combs from the first gradually to enter clips of the second and having fully entered gradually to withdraw the combs from the first conveyor, and means for drawing the two match combs in each double clip together to form a double comb for insertion in a separate book cover.

17. In a match book making machine, a conveyor for carrying rows of individual match combs equally spaced longitudinally on the conveyor, a transfer conveyor movable in the same direction as the comb carrying conveyor in close proximity thereto, said transfer conveyor being made with correspondingly spaced double clips, the directional movement of the two conveyors permitting the match combs from the first gradually to enter clips of the second and having fully entered gradually to withdraw the combs from the first conveyor, means for drawing the two match combs in each double clip together to form a double comb for insertion in an individual book cover, and means for correctly centering the double comb.

18. In a match book making machine, a conveyor for receiving rows of individual match combs, said conveyor being made with equidistant cross bars, rows of resilient fingers mounted on the sides of said bars, a plunger seated to slide in each cross bar and made with heads normally maintaining the ends of said fingers spaced to receive a match comb on each side of the heads between the said fingers, the bar being made with stops for locating the combs, and means for sliding said plunger to withdraw the heads thereby to permit the fingers to draw together and to draw the match combs together, there being in the cross bars plates for properly centering the match combs when drawn together.

19. In a match book making machine, the combination with spools supporting rolls of material of exact match comb width and laterally spaced, of means for cutting the material into match combs, means for carrying the match combs through the machine in the same laterally spaced relation, interchangeable means for independently heading the match splints of each web of combs, independent cover magazines correspondingly spaced, means for transferring combs from each web of match combs to covers of the alined magazines, and means for folding said covers and for stitching the assembled match books.

20. In a match book making machine, a comb carrier having slanting clips perpendicularly projecting, means for cutting material from a row of webs of individual match comb width into match combs and for guiding said combs with the match splints forwardly directed into engagement with said clips and for spreading said splints as they advance along the slanting surfaces of the clips, a transfer conveyor having double clips for receiving the body portions of each succeeding pair of combs, means associated with said conveyor for assembling each of said pairs into double combs, a cover conveyor fitted to hold a corresponding row of covers partly folded and positioned to receive the double combs from said transfer conveyor within the folds of said covers, means associated with said cover conveyor for pressing the sides of the covers against the sides of the match combs within the covers thereby gradually to permit the combs to be withdrawn from said transfer conveyor, and means for completing the folding of the covers around the combs and for stitching the books together.

21. In a match book machine, means for continuously feeding lines of match combs through the machine in parallel spaced relation, an interchangeable heading mechanism for each line of combs, means for feeding covers to each line of combs, means for assembling the combs in the covers, and means for stitching the assembled books.

22. In a match book machine, means for continuously feeding lines of match combs through the machine in parallel spaced relation, an interchangeable heading mechanism for each line of combs, air conditioned means for drying the heads of the combs while continuously advancing through the machine, means for feeding covers to each line of combs, means for assembling the combs in the covers, and means for stitching the assembled books.

23. In a match book making machine adapted continuously to advance a series of webs of match comb material of individual comb width, an automatic loading device through which said webs are fed and into which the ends of a second series of webs are insertable, means within said loading device and released upon the withdrawal of the end of one of the first webs out of the loading device automatically to advance the second web in uninterrupted continuation of the first, means for correctly trimming the ends of the first webs as they are approached by the beginnings of the second webs.

24. In a match book machine, a series of spools for supporting webs of individual match comb width in spaced relation to provide equal marginal spaces between the webs, means for feeding the webs from said spools through the machine in the same spaced relation, a second series of spools for similarly supporting webs, and means for individually correctly trimming the ends of the first webs and for automatically and individually feeding the webs from the second series of spools into the machine in uninterrupted continuation of the webs from the first series of spools.

25. In a match book machine, means for continuously and uninterruptedly feeding a plurality of webs of match comb material of individual match comb width through the machine in unchanged laterally spaced relation, means for dividing the material from each web into individual match combs, individual means for each web of match combs laterally spaced in alignment with said combs for heading the splints of the combs, means for feeding wider cover material into the machine in lateral alignment with the combs, and means for assembling the combs in said cover material.

26. In a match book machine, means for continuously and uninterruptedly feeding a plurality of webs of match comb material of individual comb width through the machine in unchanged laterally spaced relation, means for dividing the material from each web into individual combs, individual means for each web of combs laterally spaced in alinement with said combs for receiving the divided combs and for spreading the splints of the combs, individual means in alignment with each comb for heading the splints of the combs, means for feeding wider cover material into the machine in continued lateral alignment with the combs, and means for assembling the combs in said cover material.

WILLIAM W. ALLEN.